(12) United States Patent
Pande et al.

(10) Patent No.: US 8,761,376 B2
(45) Date of Patent: Jun. 24, 2014

(54) SYSTEM FOR CONVERSATION QUALITY MONITORING OF CALL CENTER CONVERSATION AND A METHOD THEREOF

(71) Applicant: Tata Consultancy Services Limited, Maharashtra (IN)

(72) Inventors: Arun Pande, Maharashtra (IN); Sunil Kumar Kopparapu, Maharashtra (IN)

(73) Assignee: Tata Consultancy Services Limited, Maharashtra (IN)

( * ) Notice: Subject to any disclaimer, the term of this patent is extended or adjusted under 35 U.S.C. 154(b) by 0 days.

(21) Appl. No.: 13/742,829

(22) Filed: Jan. 16, 2013

(65) Prior Publication Data

US 2013/0208881 A1    Aug. 15, 2013

(30) Foreign Application Priority Data

Feb. 13, 2012    (IN) .......................... 393/MUM/2012

(51) Int. Cl.
*H04M 3/00*    (2006.01)
*H04M 5/00*    (2006.01)

(52) U.S. Cl.
USPC .................................................. 379/265.06

(58) Field of Classification Search
USPC ................. 379/32.01, 100.05, 114.01, 133, 379/265.06, 265.01–265.14, 266.01–266.1
See application file for complete search history.

(56) References Cited

U.S. PATENT DOCUMENTS

| | | | |
|---|---|---|---|
| 6,363,145 B1 * | 3/2002 | Shaffer et al. | ............ 379/265.02 |
| 6,466,663 B1 | 10/2002 | Ravenscroft et al. | |
| 7,881,216 B2 | 2/2011 | Blair | |
| 8,065,618 B2 | 11/2011 | Kumar et al. | |
| 8,150,021 B2 | 4/2012 | Geva et al. | |
| 2007/0206764 A1 | 9/2007 | Keren et al. | |
| 2012/0224020 A1 * | 9/2012 | Portman et al. | ............ 348/14.02 |

OTHER PUBLICATIONS

Avaya "Avaya Call Center 2.1 Questions & Answers", 2004 Avaya Inc.
Taske Technology "Connecting with Contact center software", Printed on Jan. 11, 2013.
Inconcert "InConcert allergo", Submitted on Jan. 16, 2013.
Chase Data "PowerStation™ Hosted Predictive Dialing" Submitted on Jan. 16, 2013.

* cited by examiner

*Primary Examiner* — Oleg Asanbayev
(74) *Attorney, Agent, or Firm* — Hayes Soloway P.C.

(57) ABSTRACT

The present invention is related to improving a conversation quality of calls in a call center setup/environment. The system of the present invention allows monitoring of several live ongoing audio conversations to alert supervisor regarding vulnerable/deviations in the call being handled by a call center agent. The alerts are displayed on the supervisor console by way of providing graphical visual display in order to seek attention of the supervisor. The system also facilitates the supervisor to listen to the live conversation on his desktop by clicking on the visual display.

7 Claims, 2 Drawing Sheets

SYSTEM FOR CONVERSATION QUALITY MONITORING OF CALL CENTER CONVERSATION AND A METHOD THEREOF

FIELD OF THE INVENTION

The present invention is related to improving a quality of monitoring calls in a call center environment. In particular, the present invention provides a system and method that identifies vulnerable calls/agents through a graphical view and enables a supervisor to monitor simultaneously live call of multiple agents.

BACKGROUND OF THE INVENTION

A consumer perception towards products and services is known to be influenced by a quality of customer care operations offered for the product or service. In addition to supplement the consumers with information, communication forms an integral part of contact centers. These communications being necessarily formal in nature, needs to be administered (by supervisor) for offering quality support service, enabling to mould a justifiable perception of the consumer.

While administering, a concerned supervisor, team leaders or managers who is responsible for predetermined quality of communication between consumer and the contact center agent, is required to monitor the activities within the call center and, in particular, the activities and performance of call center agents working in the center.

In a typical call center setup, generally due to operational constraints the number of supervisors is always less than the number of customer care agents. Thus the supervisors can attend to only few randomly selected recorded call conversations and only one randomly selected live call. Due to this fact, the supervisors' can peruse a limited number of calls and disallowing the supervisor to supervise multiple conversations at a given instance.

Hitherto, systems for offline evaluation of agents' communication are widely known, whereas systems for live monitoring of agents' communication are still evolving. One of such systems for monitoring agents' communication with the caller is disclosed in patent No. 8,150,021 by Geva Omer et al., which discloses a system for enhancing existing quality monitoring tools for monitoring and guiding agent performance within call centers that allows a supervisor, at any particular instance, to monitor and control only one agents' communication. However, a problem of monitoring multiple live calls still remains.

Hence, there was a long felt need of a system and method for monitoring of multiple live call conversations at one view in order to reduce the tedious task of the supervisor.

In order to solve the above mentioned problems, the current invention proposes a system and method that allows the supervisor to monitor more than one ongoing live conversation between customer and customer care center agents visually. Displaying multiple call center agents' conversations can help the supervisor to monitor multiple agents simultaneously and enabling the supervisor to help agents to organize the errors in the call conversation.

Other features and advantages of the present invention will be explained in the following description of the invention having reference to the appended drawings.

OBJECTIVES OF THE INVENTION

The primary objective of the present invention is to provide a system that enables a supervisor to simultaneously monitor a plurality of live audio conversation between customers and call center agent for quality assessments.

Another significant objective of the invention is to provide a visual interpretation of multiple audio conversations between multiple call center agents and customers.

Yet another objective of the invention is to provide a system that enables a supervisor to view multiple agents' activity on the supervisor's own console.

Yet another objective of the invention is to alert vulnerable calls to the supervisor based on predetermined benchmarked quality parameters.

Yet another objective of the invention is to instantaneously connect supervisor to a live call with at least one selection modality.

Yet another objective of the invention is to provide a graphical view of deviations in the call with respect to a predefined reference by marking them appropriately to attract attention of the supervisor and subsequently to alert the supervisor upon exceeding a predetermined quality threshold.

SUMMARY OF THE INVENTION

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

The present application provides a system for allowing a supervisor to monitor more than one live audio conversation. According to one aspect of the present invention, a real time monitoring a plurality of call is enabled with a dashboard. The dashboard comprises a plurality of actionable window, each window corresponds to a live call. Each window is supplied with a real time feed of the said live call quality analysis represented in a visually appreciable format e.g. chart, graph, etc.

In one aspect of the invention, prior to conducting analysis of the live call audio stream, the said audio stream is disintegrated into an agent speech and a customer speech segment. Upon segmentation, the system can analyze the quality of the agents' speech by applying predetermined benchmarked quality parameters and identifies the vulnerable calls being handled by the call center agent.

In another aspect of the present invention, the system is configured to audio-visually alert the supervisor for each divergence in predefined quality parameters. The alerting means being audio-visual is typically adapted to attract supervisors' attention by using animated and strikingly different color gradation of window coupled with a distinct audio indicator for each divergence. A combination of such alerting means facilitating the supervisor to distinguishingly identify magnitude of vulnerability. An alert module configured to detect the divergence in the quality parameters and thus adapted to detect vulnerable calls indicating agents' level of quality deterioration compared to predetermined benchmarked quality parameters.

In another aspect of the invention, a call switching module configured to allow the supervisor to instantaneously connect to a live call of at least one selected agent and/or delegate one or more alerted vulnerable calls to randomly selected one or more idle agents, while concurrently monitoring the plurality of agent calls.

According to another aspect of the present invention, the progress of each conversation can be fragmented into small segments. The segments of the fragmented audio conversations are used for the extraction of a plurality of speech features like pitch, variation in pitch, signal energy, Mel-scale frequency Cepstral coefficient (MFCC), Linear predictor coefficients (LPC), Cepstral coefficient-Linear predictor coefficients (CC-LPC), and line spectral pairs (LSP). The extracted features from the fragmented segments of audio conversation are used to disintegrate the agents' speech signals from the customer's speech signal.

In still another aspect of the present invention, a method for quality assessment of agents' conversation with customers is disclosed. The method comprise of segmenting the agents' speech signals, analyzing the quality of the segmented speech against a predetermined benchmarked quality parameters, visually representing the speech quality and divergence thereof. The speech quality parameters comprise of a speaking rate e.g. in terms of words per minute, an emotional state of an agent e.g. neutral, angry, agitated, sad etc., the hearability of the agent say loudness are displayed on the supervisors screen as a function of time. Detecting and displaying visual alerts in a form to seek attention in each call in progress based on a predetermined benchmarked quality parameters and allowing the supervisor to instantaneously connect to a live call of at least one selected agent and/or delegating one or more alerted vulnerable calls to randomly selected one or more idle agents and switching swiftly between the a plurality of vulnerable calls while concurrently monitoring the plurality of agent calls on the supervisor console.

BRIEF DESCRIPTION OF THE ACCOMPANYING DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and apparatus disclosed in the drawings.

DETAILED DESCRIPTION OF THE INVENTION

The invention will now be described with reference to the accompanying drawing, which does not limit the scope and ambit of the invention. The description provided is purely by way of example and illustration.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

Definitions:

Supervisor:

A person with administrative rights for operational activities in a contact/call center and particularly the one who monitors performance quality of the agents therein.

Supervisors are usually authorized to monitor, guide, promote, and advise the agents regarding their performance. In other operational arrangement the supervisor may mean a manager, a senior person and a team leader.

Call Center Agent:

A call center agent is the person who handles incoming or outgoing customer telephone/voice calls relating to a particular business function. Such call center agent typically handles account inquiries, customer complaints or support issues. In other operational arrangement the call center agent may mean customer service representative (CSR), telephone sales or service representative (TSR), attendant, associate, operator, account executive, agent or team member.

Figure 1:
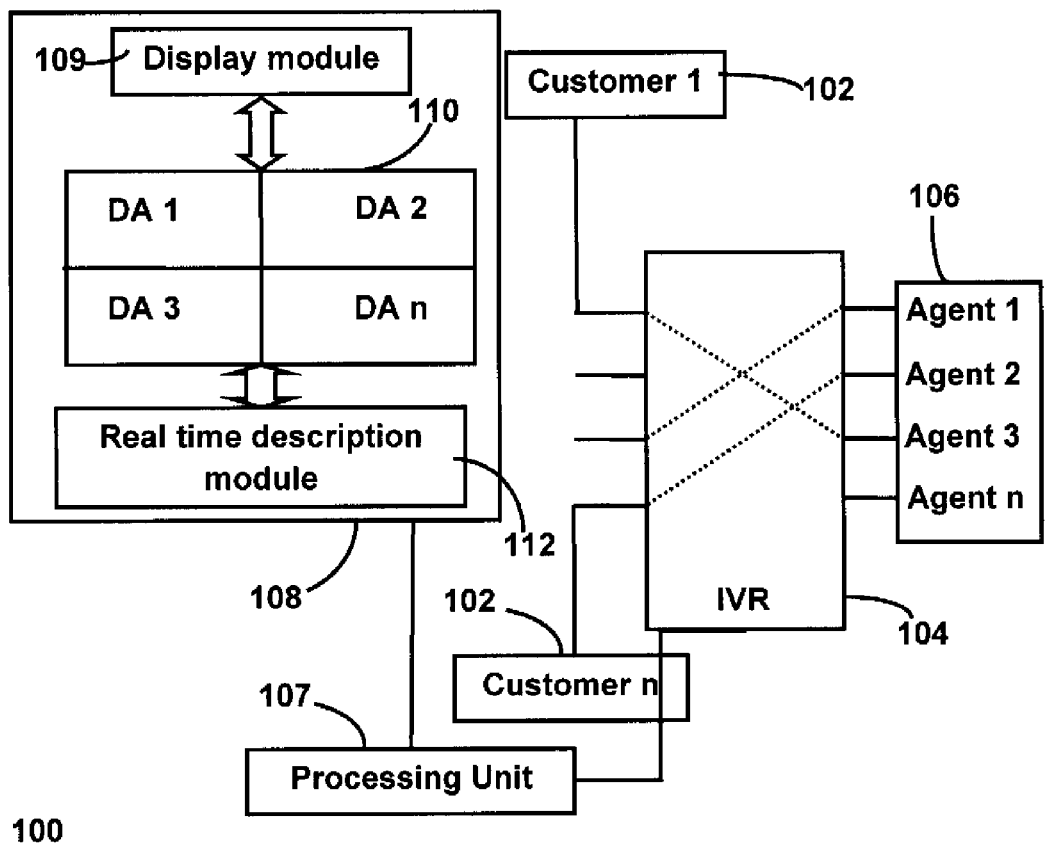
FIG. 1 is monitoring system (100) of multiple agent calls, illustrating a call center agents monitoring system with the visual display dashboard according to one exemplary embodiment of the invention.

Referring now to FIG. 1, a monitoring system (100) is illustrated to graphically display activity of live calls of multiple agents, the monitoring system (100) comprises a customer (102) who is connected from an interactive voice response (IVR) (104) to a call center agent (106), the multiplexed call lines of the IVR (104) is electrically coupled with a processing unit (107) of a supervisor console (108). The Processing unit (107) enables supervisor console (108) to connect to the live call conversations from IVR (104). The status of each call line of the agents (106) is visually represented in a corresponding actionable call window (110) of the supervisor console (108). A display module (109) controls the input/feed, action and selection of an actionable call window (110) that is responsible for showing a progress of each ongoing call of the respective agent (106). The actionable call window (110) displays analysis of the agent's speech, alters and a call selection and connection modalities.

In an exemplary embodiment of the invention, many customers (1 . . . n) (102) are connected with many call center agents (1 . . . n) (106) through the IVR (104). The IVR (104) is further connected to the supervisor console (108) though the processing unit (107). A plurality of actionable call window (110) corresponds to various activities of the call center agents (106). A real time description module (112) provides a real time description of the agents' call details upon selection thereof.

In an exemplary embodiment, the customer (102) interacts with the agent (106) for asking help to address his/her queries by calling the customer service provider call center. When customer (102) calls the call center, the customer has to follow the IVR (104) instructions in order to get connected to the call center agent (106). The IVR (104) services use pre-recorded voice prompts and menus to present information and options to callers, and touch-tone telephone keypad entry to gather responses. IVR (104) services also enable input and responses to be gathered via spoken words with voice recognition. The IVR (104) services enable users to retrieve information including bank balances, flight schedules, product details, order status, movie show times, and more from any telephone. Additionally, IVR (104) services are used to place outbound calls to deliver or gather information for appointments, past due bills, and other time critical events and activities.

In an exemplary embodiment, the ongoing conversation of a multiple call center agents (106) with various customers (102) is monitored live at the supervisor's console (108). The processing unit (107) enables linking of supervisor console (108) and the IVR (104) for connecting to the live conversations happening between customer (102) and call center agent (106). At the supervisor console (108), the actionable call window (110) visually displays the interaction activities of plurality of agents (106) with plurality of customers (102). The supervisor may select/click a live actionable call window (110) displayed on the supervisor console (108) and upon selection he is able to listen to the live audio conversation of interaction between any agent (106) and the respective customer (102) just by clicking on the display of respective agent (106) from the actionable call window (110).

In an exemplary embodiment, the display module (109) controlling the input/feed, action and selection of the actionable call window (110) responsible for showing a progress of each ongoing call of the respective agent (106). Also, the visual representation of the actionable call window (110), of the supervisor console (108) shows the graphical presentation of analysis of the audio stream based on the factors like speaking rate e.g. in terms of words per minute, the emotional state e.g. neutral, angry, agitated, sad, the hear ability e.g. loudness etc. of the respective agent (106). The graphical representation from the actionable call window (110), can further display deviations in the call with respect to the predefined knowledge base or references by marking them in order to seek the attention of the supervisor when some or all the visual features are not in the prescribed normal range. Also the supervisor with supervisor console (108) can switch to different agents (106) display by just clicking on the visual of the particular agent (106).

Figure 2:
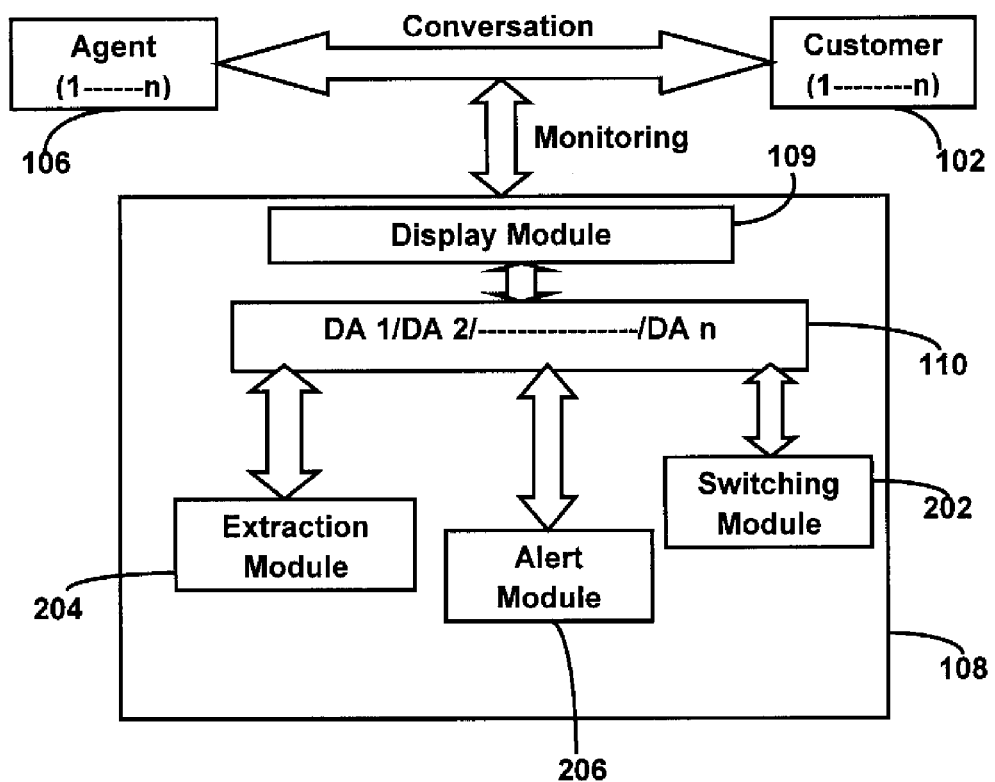
FIG. 2 is a system module diagram (200), illustrating a novel approach of real time monitoring the plurality of call conversations according to another exemplary embodiment of the invention.

Referring now to FIG. 2, the system module diagram (200), illustrating a real time monitoring of a plurality of call conversation.

There can be multiple customers (102) on conversation with multiple agents (106) in a call center setup. This conversation is continuously monitored at the supervisor console (108). The supervisor console (108) is configured to receive a real-time stream of visual representation of the plurality of audio stream in each call. The supervisor console (108) has an actionable call window (110) with plurality of agents ongoing call interaction overview which is connected with a display module (109), extraction module (204) also further connected to the alert module (206).

In an exemplary embodiment, the customer (102) is in conversation with agent (106) the supervisor console (108) captures the live ongoing conversations as a part of quality assessment. The actionable call window (110) of the supervisor console (108) shows the call progress windows that are displayed to monitor the ongoing activities at the agent's console. The display module (109) controlling the input/feed, action and selection of an actionable call window (110) responsible for showing a progress of each ongoing call of the respective agent (106).

The actionable call window (110) has an individual agent's display (DA 1, DA 2 . . . DA n) which concurrently monitor the performance of multiple individual agents (106). The actionable call window (110) shows the visual representation with a graphical presentation of analysis of the audio stream. The supervisor can visually monitor multiple agents (106) by looking at a plurality of actionable call window (110) on the supervisor console (108) at a same time of instance. The supervisor can also select an individual agent (106) whose performance is below the predefined benchmarked quality parameters for monitoring purpose by just clicking the respective actionable call window (110). Upon selecting/clicking the actionable call window (110), the supervisor is able to listen the live conversation between the customer care agent and the customer.

The extraction module (204) extracts the features like speaking rate e.g. in terms of words per minute, the emotional state e.g. neutral, angry, agitated, sad, the hear ability e.g. loudness etc. from the audio segment after segmentation. These features may be extracted at an interval of every 1 second by analyzing the conversation.

In an exemplary embodiment, the above mentioned features are displayed in graphical form in the actionable call window (110). These features are temporally displayed. The graphical representation shows the features from the current time to the previous N second so the display is continued so as to show the previous N seconds. The main function of the actionable call window (110) in the supervisor console (108) is to make the task of supervisor comparatively easier by the way of finding the abnormalities in the live conversation of multiple agents (106) visually.

In an exemplary embodiment, the actionable call window (110) is also connected to the alert module (206). The alert module (206) is configured to detect the divergence from the predefined quality parameters, each level of divergence representing a level of vulnerability in the conversation and report it to the supervisor console (108) actionable call window (110). The alert module (206) utilizes the predefined knowledge base for marking the abnormalities or any error from the live audio conversation in order to seek the attention of the supervisor using supervisor console (108). For e.g. if the agent (106) is speaking impolitely the alert module (206) will identify and the report is given to the actionable call window (110) from display module (109). Then the respective actionable call window (110) will change a color or blink to attract the attention of the supervisor, so as the supervisor from supervisor console (108) can take necessary effective action.

Further, the switching module (202) is connected to the actionable call window (110) that may be used for switching from one the agent's actionable call window (110) to another. The switching module (202) allows the supervisor on supervisor console (108) to instantaneously connect to a live call of at least a selected agent (106). The switching module (202) is configured to instantaneously switch call connection from one call to another or to at least one call upon selection thereof switching the agent (106) to live audio conversation for quality assessment.

Best Mode/Example Of Working Of The Invention

The invention is described in the example given below which is provided only to illustrate the invention and therefore should not be construed to limit the scope of the invention.

Consider a typical call center scenario wherein a supervisor wants to monitor, say 10 call center agents who are all on a live call with 10 different customers. While each of the 10 calls is in progress, a visual representation capturing the conversation quality for each of the 10 calls is being displayed on the console or desktop of the supervisor as 10 graphs/plots. Each visual is updated every second and captures the conversation quality. Say at a time t1 the customer service agent no. 6 is speaking too fast, this conversation quality (a vulnerable call) is displayed in the graph/plot corresponding to the agent #6, say by a red line in the graph to attract the attention of the supervisor. The supervisor can then by clicking on the graph of agent #6 be able to listen to the ongoing live call between the customer and the service agent #6. He can then choose to communicate to the agent remedy by asking the agent #6 to slow down his speaking rate in several ways, for example by sending a text message to the agents screen. All the while the visuals are being updated and capturing the quality of the conversation between the agents and their respective customers, thereby giving the supervisor the clarity on how the quality of conversations have been with all the agents. When the supervisor sees an alert in the visual of any of the 10 agents, he can chose to take a remedial action. When the agent is not in conversation the supervisor either is not shown a visual display or the visual display does not change every one second interval. In this way, by way of displaying multiple call center agents' conversations can help the supervisor to monitor multiple agents simultaneously and enabling the supervisor to help agents to mitigate the errors/mistakes in the call conversation itself.

We claim:

1. A system for real time monitoring of a plurality of calls, each of the plurality of calls having an agent speech segment and a customer speech segment, the system comprising:
    a supervisor console comprising a processor and a memory, and further comprising:
    a segmentation module configured to disintegrate at least one of the plurality of calls into the agent speech segment and the customer speech segment;
    an extraction module configured to extract a quality of the agent speech segment, wherein the quality of the agent speech segment comprises at least two of: speaking rate, emotional state, loudness of an agent, and quality of speech, and wherein the extraction module analyzes the quality of the agent speech segment by comparing the quality of the agent speech segment against predefined quality parameters;
    a display module comprising an actionable call window configured to receive and display in real time, a visual representation of the agent speech segment, wherein the visual representation of the agent speech segment is not a speech to text and closed captioning;
    an alert module configured to classify the at least one of the plurality of calls as at least one vulnerable call based on a detection of a divergence from the predefined quality parameters, wherein the alert module notifies a supervisor through the actionable call window by displaying the divergence on the visual representation of the agent speech segment; and
    a call switching module configured to transfer the at least one vulnerable call to a randomly selected idle agent and/or allow the supervisor to instantaneously connect to the at least one vulnerable call.

2. The system of claim 1, wherein the supervisor console comprises an actionable call progress window for each of the plurality of calls for monitoring performance of the randomly selected idle agent.

3. The system of claim 1, wherein the call switching module is further configured to provide an actionable bridging and connecting of the at least one call.

4. A method for real time monitoring of a plurality of calls, each of the plurality of calls having an agent speech segment and a customer speech segment, the method comprising:
    segmenting, by a segmentation module located in a supervisor console, at least one of the plurality of calls into the agent speech segment and the customer speech segment;
    extracting, by an extraction module located in the supervisor console, a quality of the agent speech segment and analyzing the quality of the agent speech segment by comparing the quality of the agent speech segment against predefined quality parameters, wherein the quality of the agent speech segment comprises at least two of: speaking rate, emotional state, loudness of an agent, and quality of speech;
    rendering, in real-time, a visual representation of the agent speech segment on a display module located in the supervisor console, wherein the display module comprises an actionable call window, and wherein the visual representation of the agent speech segment is not a speech to text and closed captioning;
    classifying, by an alert module located in the supervisor console, the at least one of the plurality of calls as a vulnerable call based on a detection of a divergence from the predefined quality parameters, wherein a supervisor is notified through the actionable call window by display of the divergence on the visual representation of the agent speech segment; and
    transferring, by a switching module located in the supervisor console, the vulnerable call to a randomly selected idle agent and/or allowing the supervisor to instantaneously connect to the vulnerable call.

5. The method of claim 4, wherein the supervisor console comprises the actionable call window for each of the at least one call to monitor a performance of the randomly selected idle agent.

6. The system of claim 1, wherein the segmentation module extracts at least one speech feature from the at least one of the plurality of calls, wherein the at least one speech feature is used to disintegrate the at least one of the plurality of calls into the agent speech segment and the customer speech segment.

7. The system of claim 6, wherein the at least one speech feature includes at least one of: a pitch, a variation in pitch, a signal energy, a Mel-scale frequency Cepstral coefficient (MFCC); Linear predictor coefficients (LPC); Cepstral coefficient-Linear predictor coefficients (CC-LPC); and line spectral pairs (LSP).

* * * * *